United States Patent
Jeong et al.

(10) Patent No.: US 6,233,394 B1
(45) Date of Patent: *May 15, 2001

(54) DEVICE FOR PLAYING BACK MULTIPLE KINDS OF OPTICAL DISC SELECTIVELY

(75) Inventors: Jong-Sik Jeong; Jae-Seong Shim, both of Seoul; Chan-Dong Cho; Byung-Jun Kim, both of Suwon, all of (KR)

(73) Assignee: Samsung Electronics Co., Ltd., Kyungki-Do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,633

(22) Filed: Apr. 30, 1997

(30) Foreign Application Priority Data

Jun. 14, 1996 (KR) .................................... 96-21581

(51) Int. Cl.[7] ........................................ H04N 5/781
(52) U.S. Cl. ............................. 386/126; 386/45
(58) Field of Search ................. 386/45, 35, 70, 386/94, 125, 126, 37, 83; 360/48, 60; 369/48, 54; 434/307 A

(56) References Cited

U.S. PATENT DOCUMENTS

| | | | | |
|---|---|---|---|---|
| 4,994,922 | * | 2/1991 | Goddard | 386/45 |
| 5,574,787 | * | 11/1996 | Ryan | 386/94 |
| 5,651,087 | * | 7/1997 | Nagano et al. | 386/126 |
| 5,761,372 | * | 6/1998 | Yoshinobu et al. | 386/83 |
| 5,880,941 | * | 3/1999 | Yanagihara et al. | 386/37 |
| 5,963,705 | * | 10/1999 | Kim et al. | 386/125 |

* cited by examiner

Primary Examiner—Thai Tran
Assistant Examiner—Christopher Onuaku
(74) Attorney, Agent, or Firm—Sughrue, Mion, Zinn, Macpeak & Seas, PLLC

(57) ABSTRACT

A method for playing back multiple kinds of optical discs includes making a decision as to whether a played back optical disc is classified into a digital video disc (DVD) or compact disc (CD) class, detecting the synchronization pattern of the identified disc class, reading a data stream from the optical disc by controlling the voltage controlled oscillation and the constant linear speed of the disc according to the identified disc class, decoding the data stream into the identified disc class according to the detected synchronization pattern, and transferring the decoded data stream to an audio/video decoder or a ROM decoder.

18 Claims, 2 Drawing Sheets

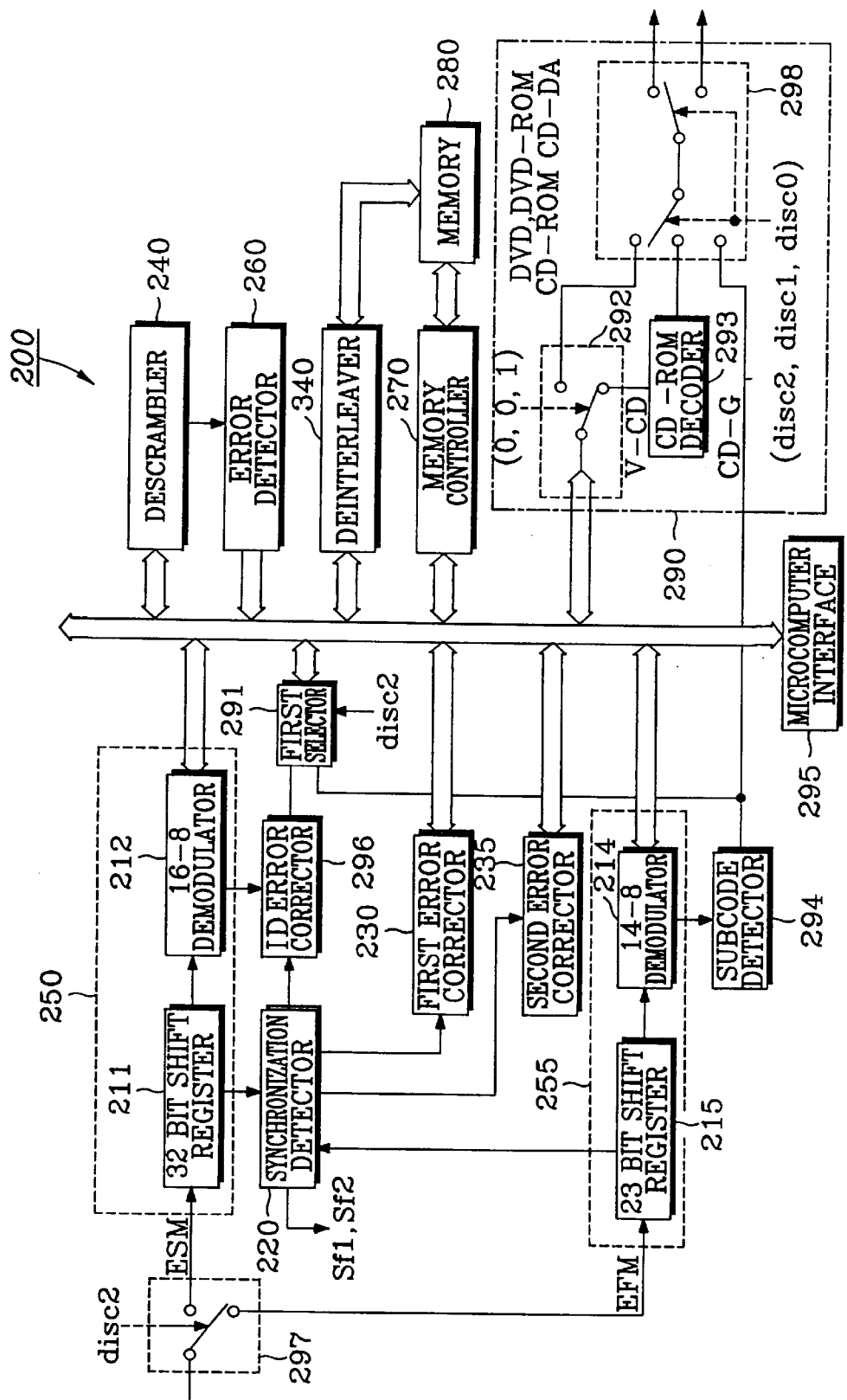

DEVICE FOR PLAYING BACK MULTIPLE KINDS OF OPTICAL DISC SELECTIVELY

BACKGROUND OF THE INVENTION

1. Field of the Invention

The present invention relates to a device for playing back an optical disc, and more particularly to a device for selectively playing back multiple kinds of optical discs.

The present invention is based on Korean Patent Application No. 21581/1996, which is incorporated by reference herein for all purposes.

2. Description of the Related Art

Generally a digital video disc (DVD) is one type of digital moving picture disc media, which is a popular type of multimedia memory for recording high image qualities and tones. More specifically, the digital video disc is a next generation recording medium for storing more than two hours of digital images according to the Moving Picture Experts Group 2 (MPEG-2) standard. Because the digital video disc and a conventional compact disc (CD) have an optical system in common, they are very similar to each other with respect to writing and reading a signal. Nevertheless each disc system uses its own play back system which is different from the other. Accordingly, inefficient utilization of resources and an economical burden on users results from these differences.

SUMMARY OF THE INVENTION

An object of the present invention is to provide a method for selectively playing back multiple kinds of optical discs.

Another object of the present invention is to provide an apparatus for selectively playing back multiple kinds of optical discs.

According to an embodiment of the present invention, a method for playing back multiple kinds of optical discs is provided to achieve the above objects, in which the method comprises identifying a disc class in which a played back optical disc is classified, wherein the class is one of a digital video disc (DVD) class and a compact disc (CD) class; detecting a synchronization pattern of the identified disc class; reading a data stream from the played back optical disc by controlling a voltage controlled oscillation and a constant linear speed of the played back optical disc according to the detected synchronization pattern; decoding the data stream according to the identified disc class based on the synchronization pattern thereby generating a decoded data stream; and transferring the decoded data stream to at least one of first and second decoders.

In order to achieve the other object there is provided a system decoder for playing back multiple kinds of optical discs employed in an apparatus having a disc drive controller for driving an optical disc and at least one of an audio/video decoder and a read-only memory (ROM) decoder, the system decoder comprising: a microcomputer for generating a disc identification signal to indicate the type of a played back optical disc, operation control signals for driving play back of the optical disc and processing data played back from the optical disc in response to the disc identification signal, and a data transmission signal upon receiving a data transmission start signal from the one of the audio/video decoder and ROM decoder; first data processing unit for demodulating, correcting errors on and descrambling a digital video disc data according to the disc identification signal; second data processing unit for demodulating and correcting errors in a compact disc data according to the disc identification signal; a switching unit for selectively transmitting the data stream played back from the optical disc to the first and second data processing unit according to the disc identification signal; synchronization detection unit for generating a synchronization detection signal for detecting various synchronization patterns of relevant types of discs according the disc identification signal; a memory used by both the first and second data processing unit for correcting errors and buffering data; a memory controller for controlling access to the memory to read data stored in the memory in response to one of the transmission control signal and operation of the one of the first and second data processing unit according to the disc identification signal; and interfacing unit for transmitting the data read from the memory to the audio/video decoder or the ROM decoder according to the disc identification signal.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 2 is a block diagram for illustrating a preferred configuration of a system decoder shown in FIG. 1.

DETAILED DESCRIPTION OF THE INVENTION

Figure 1:
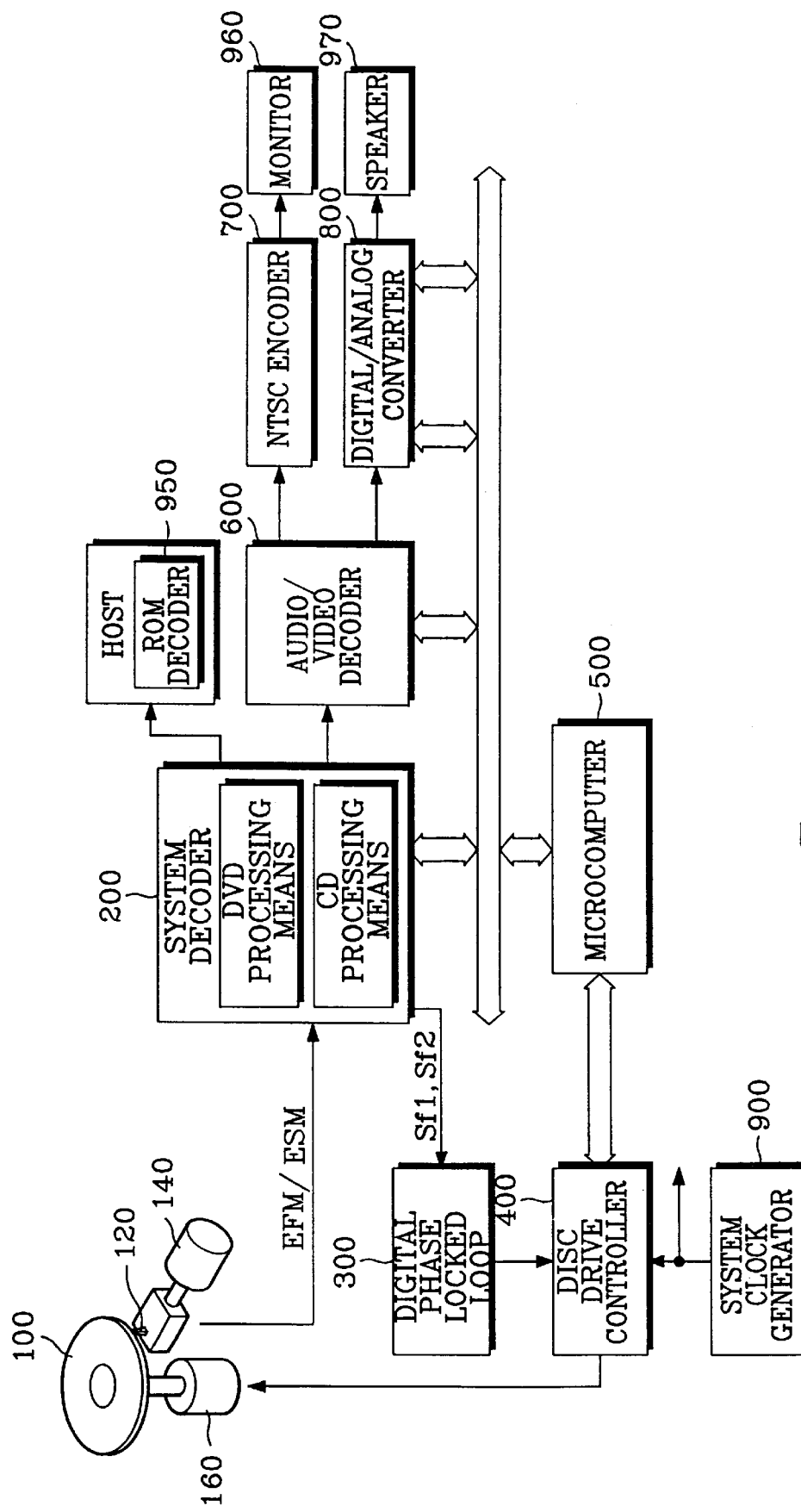
FIG. 1 is a block diagram for illustrating a preferred configuration of a device for selectively playing back multiple kinds of optical discs according to the present invention.

A preferred embodiment of a method for playing back multiple kinds of optical discs according to the present invention is described below in detail with reference to the accompanying drawings.

It is noted that the same elements are given the same reference number even in different figures, and some specified description such as configuration of circuits and elements are provided only for general understanding. So it will be evident that people having common knowledge of the field will understand the present invention to be executed without being limited by the specified description provided here. A detailed description of related conventional functions and configurations is omitted in order to avoid confusion with the essence of the present invention.

Referring to FIG. 1, a disc 100 is rotated at a specific speed by a disc motor 160, and disc information recorded on the disc is converted into a radio frequency RF analog signal which is output from an optical pick-up device having a head 120. A data stream, modulated by eight-to-sixteen modulation or eight-to-fourteen modulation (ESM/EFM) and shaped as a pulse wave, is transferred to a system decoder 200 which outputs control signals Sf1 and Sf2 to a phase locked loop (hereinafter referred to as a 'PLL') 300. The system decoder 200 consists of a DVD processing means for processing data read from a digital video disc (DVD) and a digital video ROM disc (hereinafter referred to as DVD system) and a CD processing means for processing data read from a compact disc (CD) (hereinafter referred to as a 'CD system'). A microcomputer 500 is a controller device for controlling the overall operation of the system for playing back multiple kinds of optical discs so as to perform optimal control according to each kind of optical disc by setting a prescribed register as set forth in Table 1 below, and generating a transmission control signal by receiving a data transmission operation signal from an audio/video decoder 600.

TABLE 1

| disc2 | disc1 | disc0 | Type of disc |
|-------|-------|-------|--------------|
| 1 | 0 | 0 | DVD |
| 1 | 1 | 0 | DVD-ROM |
| 0 | 0 | 0 | CD-DA |
| 0 | 0 | 1 | V-CD |
| 0 | 1 | 0 | CD-ROM |
| 0 | 1 | 1 | CD-G |

Here, DVD is a digital video disc, DVD-ROM is a digital video ROM disc, CD-DA is a compact disc-digital audio disc, V-CD is a video compact disc, CD-ROM is a compact disc read-only memory, and a CD-G is a compact disc graphics disc.

A digital phase synchronization loop, comprising a phase comparison circuit, a voltage controlled oscillator and a frequency demultiplier, generates, a first clock synchronized with a signal played back from any type of optical disc. A disc drive controller 400 controls the disc rotation to a constant linear speed and controls disc related operations by considering frequency servo signals and phase servo signals according to a frame synchronization signal Sf provided from a synchronization detector 220 in the system decoder 200. An audio/video decoder 600 classifies data from the system decoder 200 into audio and video data, and restores the original audio source data and video source data, respectively. The audio/video data demodulated by the audio/video decoder 600 is transferred to an NTSC or PAL encoder 700 and a digital/analog converter 800 and is output to a monitor 960 and a speaker 970, respectively. ROM decoder 950 built into a host, such as personal computer, is operated by the computer and transfers data from the system decoder 200 to the host via an interface.

Referring to FIG. 2, a memory 280 preferably is a dynamic RAM which is used as a buffer for compensating for differences in disc input/output rates and in correcting DVD data errors.

A switch 297 provides for separate DVD and CD processing according to first disc identification signal disc2 provided by the microcomputer (micro) 500. For example, in the register setting operation described above, a play back signal is transmitted to a first demodulator 250 if the disc is a DVD in the case of first disc identification signal disc2 being '1' and the play back signal is transmitted to a second demodulator 255 if the disc is a CD in the case of disc2 being '0'.

The first demodulator 250 demodulates the ESM input data stream in units of a symbol comprised of a prescribed number of bits. That is, the first demodulator 250 transfers the ESM data stream to a 32 bit shift register 211, and selects and transfers the upper or lower 16 bits of the 32 bits output from the 32 bit shift register 211 to a 16-8 demodulator 212. The 16-8 demodulator 212 converts the input 16 bits of data into a symbol of 8 bits and transfers it, since the data is modulated by eight-to- sixteen modulation (ESM) when written on disc 100.

The second demodulator 255 transfers the EFM data stream to a 23 bit shift register 215, and selects and transfers the upper or lower 14 bits of the 23 bits output from the 23 bit shift register 215 to a 14-8 demodulator 214. The 14-8 demodulator 214 converts the input 14 bit data into a symbol of 8 bits and transfers it, since the data is modulated by eight-to-fourteen modulation (EFM) when written on disc 100.

A synchronization detector 220 generates signals Sf, Sid, Se for detecting synchronization patterns such as a frame synchronization of a standard clock used in controlling rotation of disc 100, a sector synchronization for classifying sectors and an error correction synchronization for reading data in an error correction block when correcting errors. Also it establishes a window for recognizing if synchronization, detected within a restricted range, is valid and forces generation of a detection signal in case of no synchronization.

An interface 295 interfaces the micro 500 and the system decoder 200.

A memory controller 270 generates a row address signal, a column address signal and other address signals necessary for correcting errors in or buffering data played back from the relevant disc according to first through third disc identification signals disc2–disc0, and prevents overflow and underflow. The memory controller 270 also controls operations for reading data from memory 280 to transfer it to the audio/video decoder 600 or ROM decoder 950.

A first error corrector 230 vertically and horizontally corrects errors in an error correction block of data read from a DVD system disc. For convenience's sake, it is assumed that the horizontal and vertical directions are 182-172-11 and 208-192-17. In other words, the length of the code words are 182 and 208 bits, the main data bits (except for parity bits) are 172 and 192 bits in length, and the intervals between code words are 11 and 17 bits, respectively. During error correction, the memory 280 forms the error correction block by storing ID data and main data in units of a block. The error correction block comprises 16 sectors of data.

A second error correction means 235 corrects errors in data read from a CD system disc by using a conventional Cross Interleave Reed Soloman code. The memory 280 buffers data and stores the corrected data generated between the two correctors.

A descrambler 240 restores received data to the original main data by descrambling the main data of the DVD system data stored in memory 280, which is scrambled before being written on the disc, in which the main data is 2 kilobytes in length.

An error detector 260 detects an error contained in data transmitted from the descrambler 240. The error provides information helpful in deciding whether repetition of error correction by the micro 500 is necessary.

A deinterleave unit 340 may be constructed to incorporate interleave rules, an address counter and an adder, so as to store data according to an original arrangement by restoring data interleaved in units of a frame by controlling the write/read address of the memory 280. For example, in the present embodiment of the invention, the interleave unit 340 is shown to be arranged separately, but it can be contained in the physical circuit of the memory controller 270, and error correction, descrambling and deinterleave operations are performed.

An ID error corrector 296 corrects errors in the ID data transferred from the 16-8 demodulator 212. The corrected ID data, with an ID flag, is transferred to micro 500 and is used so as to let micro 500 control a DVD system disc 100 searching operation. The corrected ID data is stored in the relevant area of the memory 280. The stored ID data having any uncorrected error in the main data is corrected again by the first error corrector 230 and replaced in the memory 280 with the corrected ID data and transferred to audio/video decoder 600 or interface 295 together with scrambled main data. The ID error corrector 296 performs error correction on an ID of a different source by properly dividing a sector synchronization period. For example, suppose that an ID correction type is a Reed-Solomon RS(6, 4, 3) type, where "6" is the codeword length, "4" is the main data, and 3 is the interval between codewords. A subcode detector 294 extracts subcode data P-W from the CD system demodulated data transferred from the 14-8 demodulator 214. A first selector 291 transmits the corrected ID data from the ID error corrector 296 or a subcode Q bit and error flag from the subcode detector 294 through micro interface 295 to the micro 500. The selection depends on the state of the first disc identification signal disc2 which indicates whether the data is from a CD or DVD system.

An interface unit 290 performs interfacing between the system decoder 200 and the audio/video decoder 600. The memory controller 270 reads and transmits descrambled DVD system data from memory 280 through the interface unit 290 to audio/video decoder 600 and ROM decoder 950 according to the system clock, under control of micro 500. The interface unit 290 performs the operations of timing control, eliminating noise, changing signal arrangement and decoding addresses. The interface unit 290 comprises a switch 292 and a conventional CD-ROM decoder 293 for transmitting data read from a video compact disc (V-CD) to the CD-ROM decoder 293. Typically, the audio/video decoder 600 does not include a CD-ROM decoder, and it may be omitted if not necessary. The switch 292 is connected to the CD-ROM decoder 293 in the case of first to third disc identification signals disc2-disc0 having values 0,0,1, respectively.

Second selector 298 of the interface unit 290 selects V-CD data processed by the CD-ROM decoder 293, DVD system data from the memory 280, or CD system data or one of the subcodes R, S, T, U, V, and W (CD-G data) detected from the subcode detector 294, and transmits ROM data (DVD ROM and CD-ROM) to ROM decoder 950 and other CD or DVD system data to the audio/video decoder 600 according to the first to third disc identification signals, disc2–disc0, output from micro 500.

Thus, the play back system of the present invention has multiple functions of a CD system and DVD disc play back system, which are selectively chosen. While there have been illustrated and described what are considered to be preferred embodiments of the present invention, it will be understood by those skilled in the art that various changes and modifications may be made, and equivalents may be substituted for elements thereof, without departing from the true scope of the present invention. In addition, many modifications may be made to adapt a particular situation to the teachings of the present invention without departing from the central scope thereof. Therefore, it is intended that the present invention not be limited to the particular embodiment disclosed herein as the best mode contemplated for carrying out the present invention, but that the present invention includes all embodiments falling within the scope of the appended claims.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for playing back multiple kinds of optical discs, comprising:

identifying a plurality of disc classes including at least a digital video disc (DVD) class and a compact disc (CD) class;

selecting from said plurality of disc classes a disc class to which a played back optical disc belongs;

detecting a synchronization pattern of the selected disc class;

reading a data stream from said played back optical disc by controlling a voltage controlled oscillation and a constant linear speed of the played back optical disc according to the detected synchronization pattern;

decoding said data stream according to said selected disc class based on the synchronization pattern thereby generating a decoded data stream; and transferring the decoded data stream to at least one of first and second decoders.

2. A method as defined in claim 1, wherein said first decoder is an audio/visual decoder and said second decoder is a read-only memory (ROM) decoder.

3. A method as defined in claim 1, wherein said decoding said data comprises decoding according to a CD-ROM recording format and detecting a subcode.

4. A system for playing back multiple kinds of optical discs employed in an apparatus having a disc drive controller for driving an optical disc and at least one of an audio/video decoder and a read-only memory (ROM) decoder, the system comprising:

a microcomputer for generating a disc identification signal to indicate the type of a played back optical disc, operation control signals for driving play back of said optical disc and processing data played back from said optical disc in response to said disc identification signal, and a data transmission signal upon receiving a data transmission start signal from said one of said audio/video decoder and ROM decoder;

synchronization detection means for generating a synchronization detection signal for detecting various synchronization patterns of relevant types of discs according to said disc identification signal;

first data processing means for demodulating, correcting errors on and descrambling a digital video disc data according to said synchronization detection signal;

second data processing means for demodulating and correcting errors in a compact disc data according to said synchronization detection signal;

a switching means for selectively transmitting said data stream played back from said optical disc to said first and second data processing means according to said disc identification signal;

a memory used by both said first and second data processing means for correcting errors and buffering data;

a memory controller for controlling access to said memory to read data stored in said memory in response to one of said transmission control signal and operation of said one of said first and second data processing means according to said disc identification signal; and interfacing means for transmitting said data read from said memory to one of said audio/video decoder and said ROM decoder according to said disc identification signal.

5. A system for playing back multiple kinds of optical discs as defined in claim 4, characterized in that said first data processing means comprises:

a demodulator for demodulating the data stream played back from said disc in units of symbols having a prescribed number of bits;

an ID error corrector for detecting an ID data in data demodulated by said demodulator, correcting an error in said ID data, transmitting an error corrected ID data to said microcomputer and storing the error corrected ID data in said memory;

an error corrector for correcting an error in the demodulated data and outputting error corrected data;

a descrambler for receiving and demodulating main data from said error corrected data into original data and compensating for a time delay due to scrambling; and an error detector for providing said microcomputer with information indicating whether error correction should be repeated by detecting an error contained in data output from said descrambler.

6. A system for playing back multiple kinds of optical disc as defined in claim 5, wherein said demodulator is a sixteen-to-eight demodulator which converts said data played back from said disc from sixteen to eight bits.

7. A system for playing back multiple kinds of optical discs as defined in claim 5, characterized in that the error corrector vertically and horizontally corrects the error in a block of the demodulated data and said memory buffers data between error correction operations.

8. A system for playing back multiple kinds of optical discs as defined in claim 4, characterized in that said second data processing means comprises:

a demodulator for demodulating said data played back from said disc in units of a symbol having a prescribed number of bits and outputting demodulated data; and a subcode detector for providing said microcomputer information for demodulating a sector location for use in disc control and storing said information in said memory by detecting subcode data in the demodulated data and correcting an error in said subcode data.

9. A system for playing back multiple kinds of optical discs as defined in claim 8, wherein said demodulator is a fourteen-to-eight demodulator which converts said data played back from said disc from fourteen to eight bits.

10. A system for playing back multiple kinds of optical discs as defined in claim 4, characterized in that said interfacing means comprises a compact disc read-only memory (ROM) decoder for descrambling and correcting an error in data read from a video compact disc.

11. A system for playing back multiple kinds of optical discs as defined in claim 4, characterized in that said memory is a dynamic random access memory (RAM).

12. A system for playing back multiple kinds of optical discs as defined in claim 4, characterized in that said digital video disc system data is one of data read from a digital video disc (DVD) and data read from a DVD read-only memory (ROM).

13. A system for playing back multiple kinds of optical discs as defined in claim 4, characterized in that said compact disc data is data read from one of a compact disc, a video compact disc, a compact disc read-only memory (ROM) and a compact disc graphic (CD-G).

14. A system for playing back multiple kinds of optical discs as defined in claim 4, characterized in that the disc drive controller controls a constant linear speed of the optical disc according to said disc identification signal.

15. A method for playing back multiple kinds of optical discs, comprising:

configuring a synchronization detector to identify a plurality of disc classes including at least a digital video disc (DVD) class and a compact disc (CD) class;

selecting from said plurality of disc classes a disc class to which a played back optical disc belongs;

detecting a synchronization pattern of the selected disc class;

reading a data stream from said played back optical disc by controlling a voltage controlled oscillation and a constant linear speed of the played back optical disc according to the detected synchronization pattern; and decoding said data stream according to said selected disc class based on the synchronization pattern thereby generating a decoded data stream.

16. A method as defined in claim 15, further comprising:

transferring the decoded data stream to at least one of first and second decoders.

17. A method as defined in claim 16, wherein said first decoder is an audio/visual decoder and said second decoder is a read-only memory (ROM) decoder.

18. A method as defined in claim 15, wherein said decoding said data comprises decoding according to a CD-ROM recording format and detecting a subcode.

* * * * *